US008239478B2

(12) United States Patent
Bruker

(10) Patent No.: US 8,239,478 B2
(45) Date of Patent: Aug. 7, 2012

(54) COMPUTER SYSTEM

(75) Inventor: Dov Bruker, Ra'anana (IL)

(73) Assignee: Fourier Systems (1989) Ltd., Rosh Ha'ayin (IL)

(*) Notice: Subject to any disclaimer, the term of this patent is extended or adjusted under 35 U.S.C. 154(b) by 1264 days.

(21) Appl. No.: 11/641,568

(22) Filed: Dec. 18, 2006

(65) Prior Publication Data
US 2008/0147849 A1   Jun. 19, 2008

(51) Int. Cl.
*G06F 15/16* (2006.01)
*G06F 15/173* (2006.01)

(52) U.S. Cl. .................. 709/217; 709/205; 709/224

(58) Field of Classification Search ............ 709/205, 709/217, 224
See application file for complete search history.

(56) References Cited

U.S. PATENT DOCUMENTS

| | | | |
|---|---|---|---|
| 5,211,564 A | 5/1993 | Martinez et al. | |
| 5,565,316 A | 10/1996 | Kershaw et al. | |
| 5,827,070 A | 10/1998 | Kershaw et al. | |
| 5,915,973 A | 6/1999 | Hoehn-Saric et al. | |
| 6,032,257 A * | 2/2000 | Olarig et al. | 726/35 |
| 6,195,528 B1 | 2/2001 | Young et al. | |
| 6,259,890 B1 | 7/2001 | Driscoll et al. | |
| 6,948,153 B2 | 9/2005 | Bowers | |
| 6,966,048 B2 | 11/2005 | Bowers | |
| 7,024,698 B2 * | 4/2006 | Tanaka et al. | 726/26 |
| 7,080,303 B2 | 7/2006 | Bowers | |
| 7,082,359 B2 | 7/2006 | Breed | |
| 7,085,623 B2 | 8/2006 | Siegers et al. | |
| 7,467,187 B2 * | 12/2008 | Hesselink et al. | 709/205 |
| 7,502,933 B2 * | 3/2009 | Jakobsson et al. | 713/172 |
| 7,554,441 B2 * | 6/2009 | Viegers et al. | 340/539.22 |
| 7,600,036 B2 * | 10/2009 | Hesselink et al. | 709/234 |
| 7,788,404 B2 * | 8/2010 | Hesselink et al. | 709/241 |
| 2003/0129573 A1 | 7/2003 | Bowers et al. | |
| 2003/0138765 A1 | 7/2003 | Bowers | |
| 2003/0182602 A1 | 9/2003 | Bowers | |
| 2003/0196170 A1 | 10/2003 | Bowers | |
| 2003/0203342 A1 | 10/2003 | Bowers | |
| 2004/0229199 A1 | 11/2004 | Ashley et al. | |
| 2006/0088811 A1 | 4/2006 | Park et al. | |
| 2006/0107254 A1 | 5/2006 | Bowers | |

OTHER PUBLICATIONS

Brochure: "Data Acquisition Solutions for Industry", Fourier Systems, Apr. 2004.
Brochure: "Data Logging Kits", Fourier Systems, Jun. 2005.

* cited by examiner

*Primary Examiner* — Kristie Shingles
(74) *Attorney, Agent, or Firm* — Pearl Cohen Zedek Latzer, LLP

(57) ABSTRACT

A computer system including a computer network, a multiplicity of network enabled portable computers, each including at least one sensor for sensing an operational status aspect thereof and a communicator for providing status information via the network and a maintenance center communicating via the computer network with the multiplicity of portable computers and being operative for automatically receiving the status information and for providing maintenance directives based thereon.

31 Claims, 14 Drawing Sheets

COMPUTER SYSTEM

FIELD OF THE INVENTION

The present invention relates to wireless computer systems, and more specifically to wireless computer systems employed in schools.

BACKGROUND OF THE INVENTION

The following patent publications are believed to represent the current state of the art:

U.S. Pat. Nos. 7,085,623; 7,082,359; 7,080,303; 6,966,048; 6,948,153; 6,259,890; 6,195,528; 5,915,973; 5,827,070; 5,565,316 and 5,211,564; and U.S. patent application Publication Nos. 2006/0107254; 2006/0088811; 2004/0229199; 2003/0203342; 2003/0196170; 2003/0182602; 2003/0138765 and 2003/0129573.

SUMMARY OF THE INVENTION

The present invention seeks to provide a wireless computer system, and more specifically a wireless computer system suitable for schools.

There is thus provided in accordance with a preferred embodiment of the present invention it computer system including a computer network, a multiplicity of network enabled portable computers, each including at least one sensor for sensing an operational status aspect thereof and at least one communicator for providing status information based on an output of the at least one sensor via the computer network and it maintenance center communicating via the computer network with the multiplicity of portable computers and being operative for automatically receiving the status information and for providing maintenance directives based thereon.

In accordance with a preferred embodiment of the present invention the at least one sensor includes at least one of an inverter current sensor operative to measure a current to an inverter and an inverter output voltage sensor operative to measure a high voltage output of the inverter. Preferably, the status information includes information related to functionality of at least one of the inverter and a display of the portable computer.

In accordance with another preferred embodiment of the present invention the at least one sensor includes at least one of a voltage sensor, a current sensor and a temperature sensor. Preferably, the status information includes information related to functionality of a battery of the portable computer. Additionally or alternatively, the computer network is a wireless computer network.

There is also provided in accordance with another preferred embodiment of the present invention a computer system including a computer network, a multiplicity of network enabled portable computers, each including at least one communicator for providing security status information received from the computer via the computer network and a security center intermittently communicating via the computer network with the multiplicity of portable computers and being operative for automatically providing a security indication in response to a security status information communication failure, of at least one of the multiplicity of portable computers, fulfilling predetermined criteria.

In accordance with a preferred embodiment of the present invention the computer network is operative to permit transmission of security status information only within a predetermined geographical region. Preferably, the predetermined criteria includes the elapse of a predetermined time duration since a previous communication between the at least one of the multiplicity of portable computers and the security center. Additionally or alternatively, the at least one of the multiplicity of portable computers includes a security subassembly which is operative to disable the at least one of the multiplicity of portable computers in response to the security status information communication failure.

In accordance with another preferred embodiment of the present invention the at least one of the multiplicity of portable computers also includes computerized watchdog functionality operative to disable the at least one of the multiplicity of portable computers in response to the security status information communication failure. Preferably, the computer network is operative to permit transmission of security status information from a remote geographical location over a secured network connection. Additionally or alternatively, the multiplicity of portable computers includes at least one biometric information enabled portable computer in communication with a biometric information input device, and wherein the inputs received by the biometric information input device are employed to determine whether the at least one biometric information enabled portable computer is in possession of an authorized user thereof.

In accordance with a further preferred embodiment of the present invention the security indication includes a report including identification of the at least one of the multiplicity of portable computers. Preferably, the computer network is a wireless computer network.

There is further provided in accordance with a further preferred embodiment of the present invention a distributed assessment system including a multiplicity of network enabled portable computers, each including at least one network communicator for receiving assessment materials, and providing assessment results via a computer network, each of the multiplicity of portable computers presenting the assessment materials to a person undergoing assessment and an assessment controller communicating via the computer network with the multiplicity of portable computers and operative to synchronize the timing of presentation of the assessment materials to multiple persons undergoing assessment using the multiplicity of portable computers.

In accordance with a preferred embodiment of the present invention the assessment controller is also operative to synchronize the timing of a window for receiving assessment inputs from the multiple persons undergoing assessment using the multiplicity of portable computers. Preferably, the assessment controller is operative to synchronize the timing of the window by simultaneously presenting the assessment materials to the multiple persons using the multiplicity of portable computers and simultaneously terminating presentation of the assessment materials to the multiple persons using the multiplicity of portable computers.

In accordance with another preferred embodiment of the present invention the assessment controller is operative to synchronize the timing of presentation by simultaneously presenting the assessment materials to the multiple persons using the multiplicity of portable computers. Preferably, the assessment materials include multiple portions and the multiple portions of the assessment materials are presented to at least one of the multiple persons in a different order than the order presented to at least one other of the multiple persons.

In accordance with a further preferred embodiment of the present invention at least one of the multiplicity of portable computers includes a biometric information input device, and wherein the biometric information input device is employed to determine whether one of the multiple persons using one of the at least one of the multiplicity of portable computers is authorized to use the one of the at least one of the multiplicity of portable computers, prior to presenting the assessment materials to the one of the multiple persons. Preferably, at least one of the multiplicity of portable computers receives the assessment materials at a different time than the time at which the assessment materials are received by at least one other of the multiplicity of portable computers. Additionally or alternatively, the computer network is a wireless computer network.

There is yet further provided in accordance with yet a further preferred embodiment of the present invention a distributed assessment system including a multiplicity of network enabled portable computers, each including at least one network communicator for receiving assessment materials and providing assessment results via a computer network, each of the multiplicity of portable computers presenting the assessment materials to a person undergoing assessment and an assessment controller communicating via the computer network with the multiplicity of portable computers and being operative to synchronize the timing of a window for receiving assessment inputs from multiple persons undergoing assessment using the multiplicity of portable computers.

In accordance with a preferred embodiment of the present invention the assessment controller is operative to synchronize the timing of the window by simultaneously presenting the assessment materials to the multiple persons using the multiplicity of portable computers and simultaneously terminating presentation of the assessment materials to the multiple persons using the multiplicity of portable computers. Preferably, the assessment materials include multiple portions and the multiple portions of the assessment materials are presented to at least one of the multiple persons in a different order than the order presented to at least one other of the multiple persons.

In accordance with another preferred embodiment of the present invention at least one of the multiplicity of portable computers include a biometric information input device, and wherein the biometric information input device is employed to determine whether one of the multiple persons using one of the at least one of the multiplicity of portable computers is authorized to use the one of the at least one of the multiplicity of portable computers, prior to presenting the assessment materials to the one of the multiple persons. Preferably, at least one of the multiplicity of portable computers receives the assessment materials at a different time than the time at which the assessment materials are received by at least one other of the multiplicity of portable computers. Additionally or alternatively, the computer network is a wireless computer network.

There is still further provided in accordance with a still further preferred embodiment of the present invention an interactive computer including at least one port enabling, connection thereto of an external sensor for sensing an experimental parameter and interactive e-book software operative to prompt a user to conduct an experiment, to receive the experimental parameter from the external sensor and to display a visual representation of the experimental parameter.

In accordance with a preferred embodiment of the present invention the external sensor includes at least one of a thermocouple, a light sensor, a humidity sensor, a motion sensor, a pH sensor, an electrical parameter sensor, a biometric sensor and an audio sensor. Preferably, the interactive computer also includes at least one communicator operative to communicate with an experimentation control and logging server via a computer network.

In accordance with another preferred embodiment of the present invention at least one of the experimental parameter and the visual representation of the experimental parameter is logged by the experimentation control and logging server. Preferably, the computer network is a wireless computer network.

There is additionally provided in accordance with an additional preferred embodiment of the present invention an interactive experimentation system including at least one network enabled interactive computer including at least one port enabling connection thereto of an external sensor for sensing an experimental parameter and interactive e-book software operative to prompt a user to conduct an experiment, to receive the experimental parameter from the external sensor and to display a visual representation of the experimental parameter, and an experimentation control and logging server communicating with the at least one interactive computer via a computer network and being operative to log at least one of the experimental parameter and the visual representation of the experimental parameter.

In accordance with a preferred embodiment of the present invention the external sensor includes at least one of a thermocouple, a light sensor, a humidity sensor, a motion sensor, a pH sensor, an electrical parameter sensor, a biometric sensor and an audio sensor. Preferably, the computer network is a wireless computer network.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
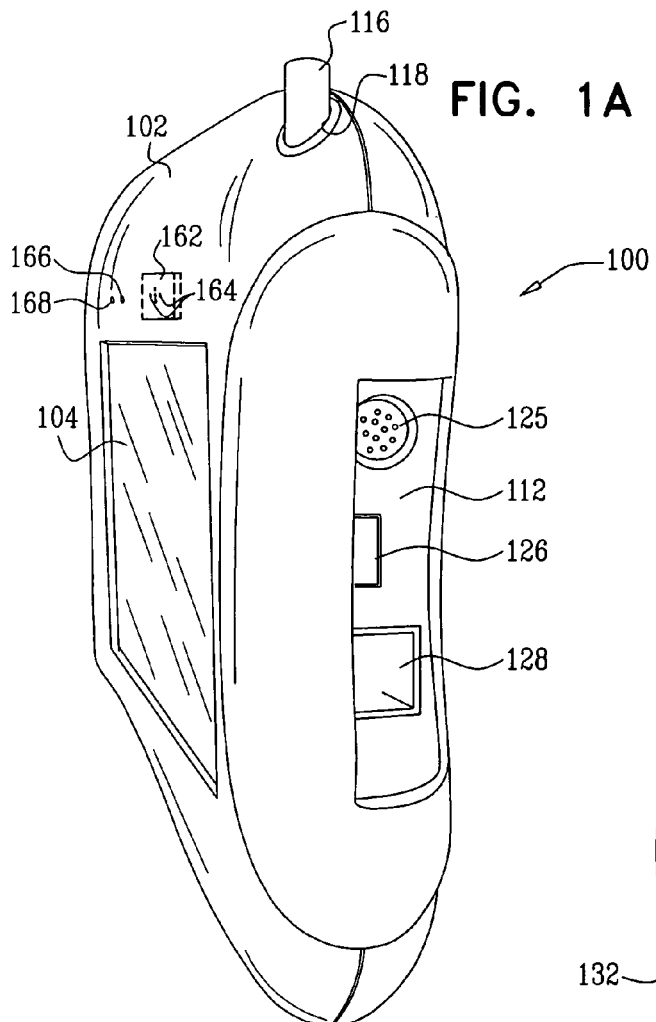
FIGS. 1A, 1B, 1C and 1D are simplified pictorial illustrations of a computer constructed and operative in accordance with a preferred embodiment of the present invention, from four different perspectives.
Figure 1B:
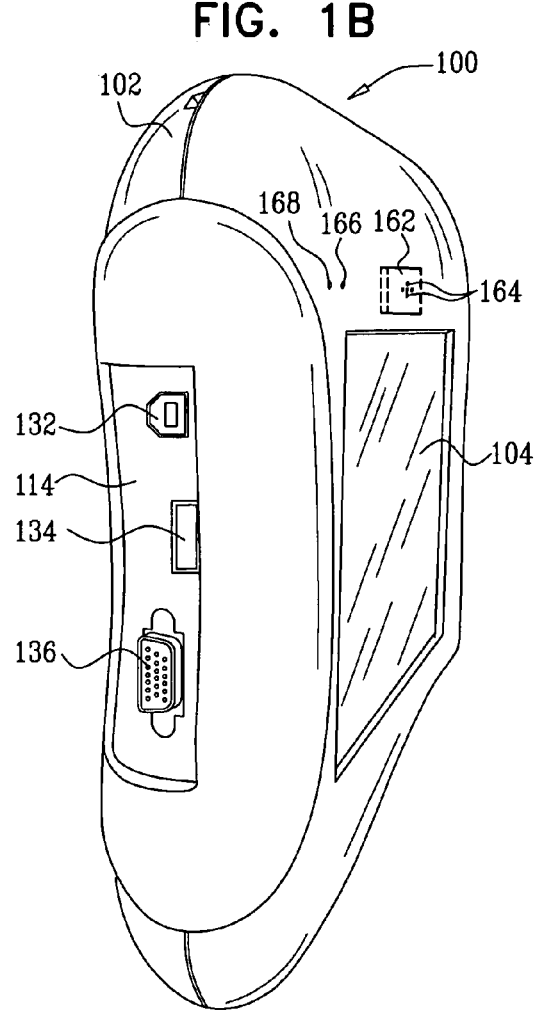
Figure 1C:
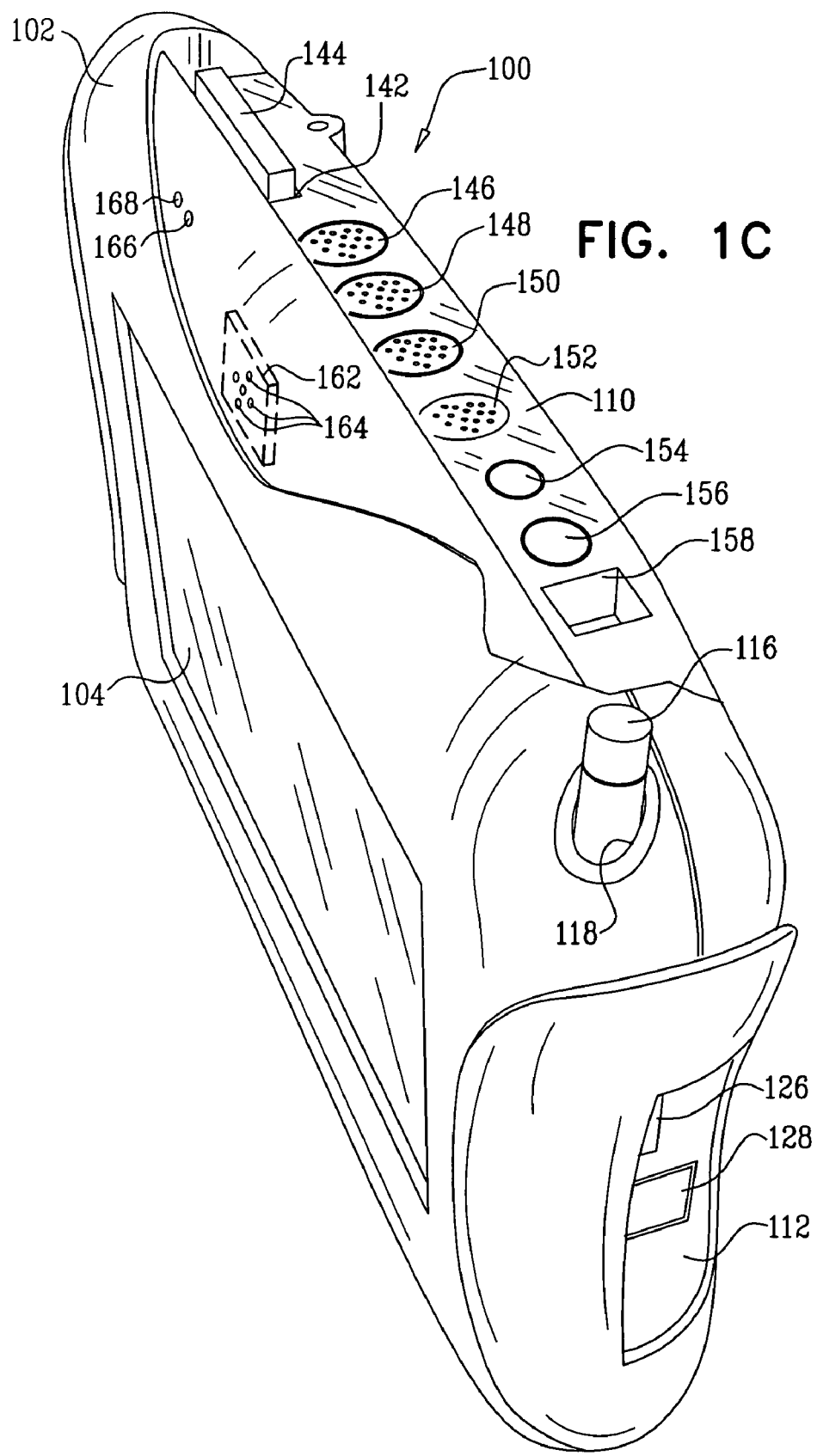
Figure 1D:
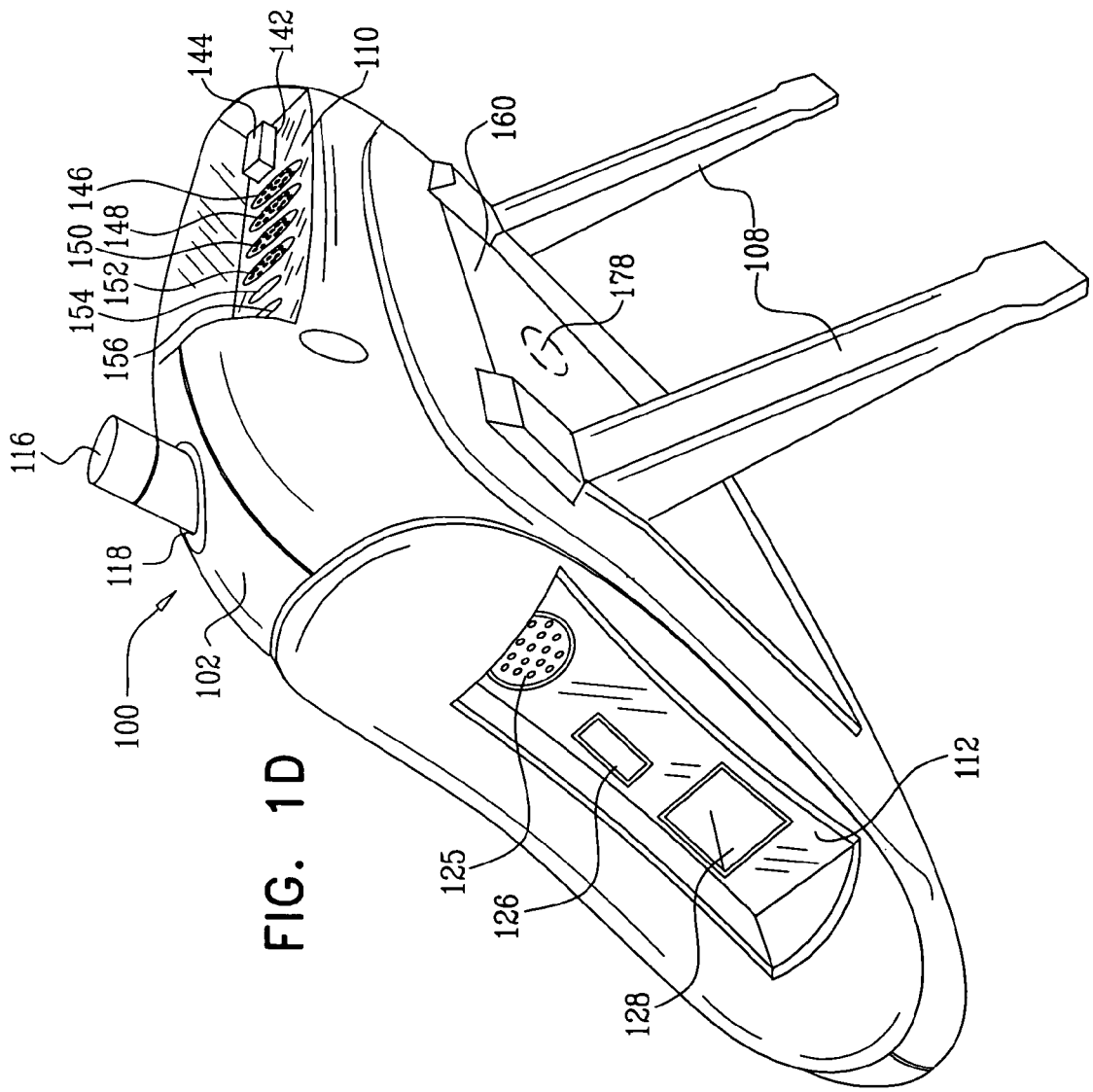
Figure 2:
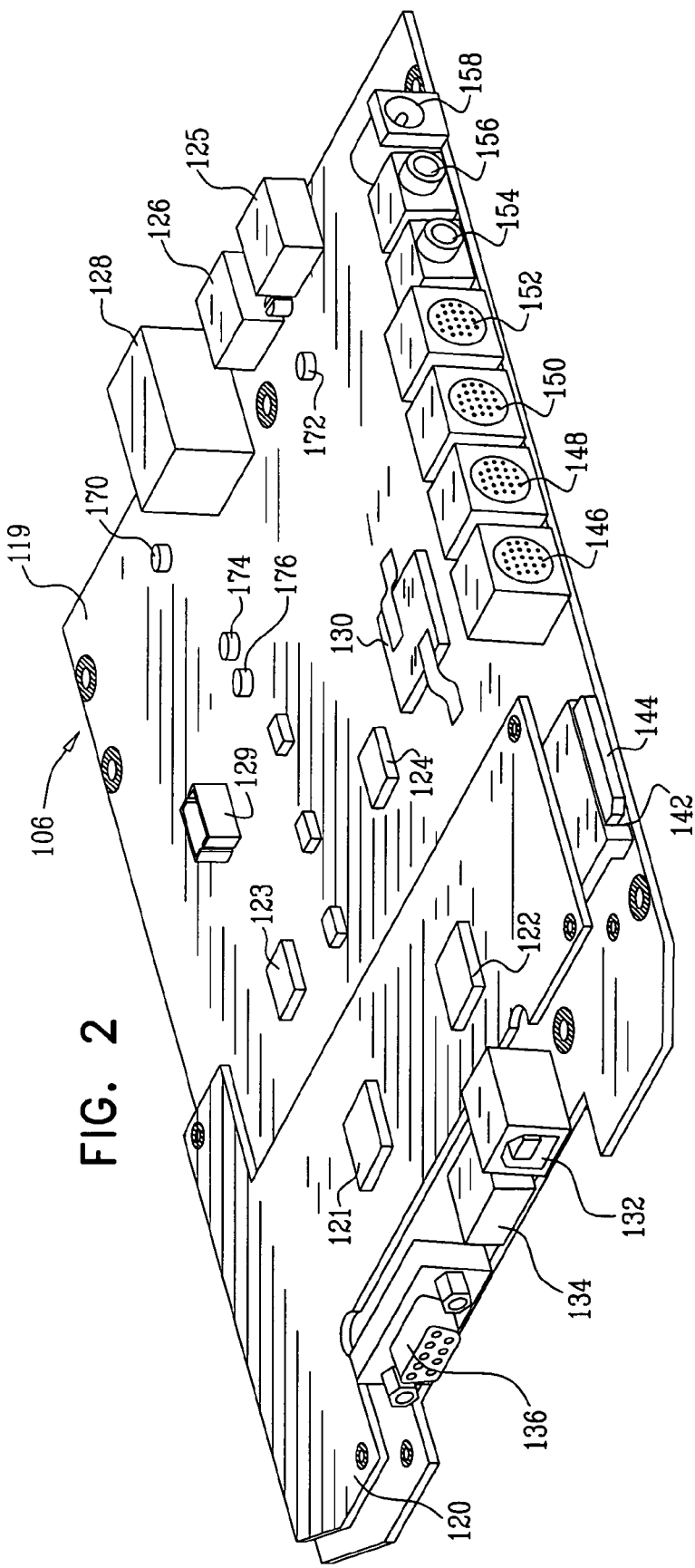
FIG. 2 is a simplified pictorial illustration of a circuit board assembly forming part of the computer of FIGS. 1A-1D.

Reference is now made to FIGS. 1A-1D, which are simplified pictorial illustrations of a computer 100 constructed and operative in accordance with a preferred embodiment of the present invention, from four different perspectives, and to FIG. 2, which is a simplified pictorial illustration of a printed circuit board forming part of the computer of FIGS. 1A-1D.

As seen in FIGS. 1A-1D and FIG. 2, the computer 100 comprises a housing 102 preferably formed by molding high impact plastic. Mounted in housing 102 is a screen 104, such as an LCD screen, and a circuit board assembly 106. The housing 102 is preferably formed with retractable legs 108 and top, right and left port access openings 110, 112 and 114, respectively. A stylus 116 is preferably removably retained in a stylus recess 118.

As seen with particular clarity in FIG. 2, circuit board assembly 106 preferably includes a main board 119 and a secondary board 120. A WINDOWS® processor 121 and an ETHERNET® transceiver 122 are mounted on the secondary board 120 and a data logging processor 123 and a WI-FI transceiver 124 are mounted on the main board 119. Mounted on main board 119 adjacent right port access opening 112 are a PS-2 keyboard port 125, a Type A USB port 126 and an ETHERNET® port 128, all of which communicate with the WINDOWS® processor 121. Also mounted on main board 119 are a battery connector 129 and a micro SD port 130.

Mounted on main board 119 adjacent left port access opening 114 are a Type B USB port 132, a Type A USB port 134 and a VGA port 136, all of which communicate with the WINDOWS® processor 121. Mounted on main board 119 adjacent top port access opening 110 are a compact flash memory slot 142, which preferably includes a flash memory card 144 which communicates with the WINDOWS® processor 121. Also mounted on main board 119 adjacent top port access opening 110 are four external sensor input/output ports 146, 148, 150 and 152, such as Mini DIN ports, for coupling to external experimentation sensors (not shown), a stereo audio port 154, a microphone port 156 and an external charger input port 158. Ports 146, 148, 150 and 152 communicate with the data logging processor 123. Ports 154, 156 and 158 communicate with components on the main board 119. A battery 160 is coupled to battery connector 129 and is disposed within housing 102 underlying circuit board assembly 106.

A speaker 162 is disposed underlying a speaker opening grid 164 in the housing 102; a battery status LED 166 and a fiber optic end 168 coupled to an ambient light sensor (not shown) are disposed adjacent thereto. The ambient light sensor is preferably used to automatically adjust the illumination level of the LCD display 104.

Disposed adjacent port 128 is an inverter current sensor 170, which is operative to measure the current to an inverter, not shown, which supplies the backlight power to the LCD display 104.

Disposed adjacent ports 125 and 126 is an inverter output voltage sensor 172, which is operative to measure the high voltage output of the inverter, not shown, which supplies the backlight power to the LCD display 104.

Disposed adjacent battery connector 129 are a voltage sensor 174 and a current sensor 176, both of which provide indications of battery function. A temperature sensor 178 is located adjacent battery 160.

Figure 3:
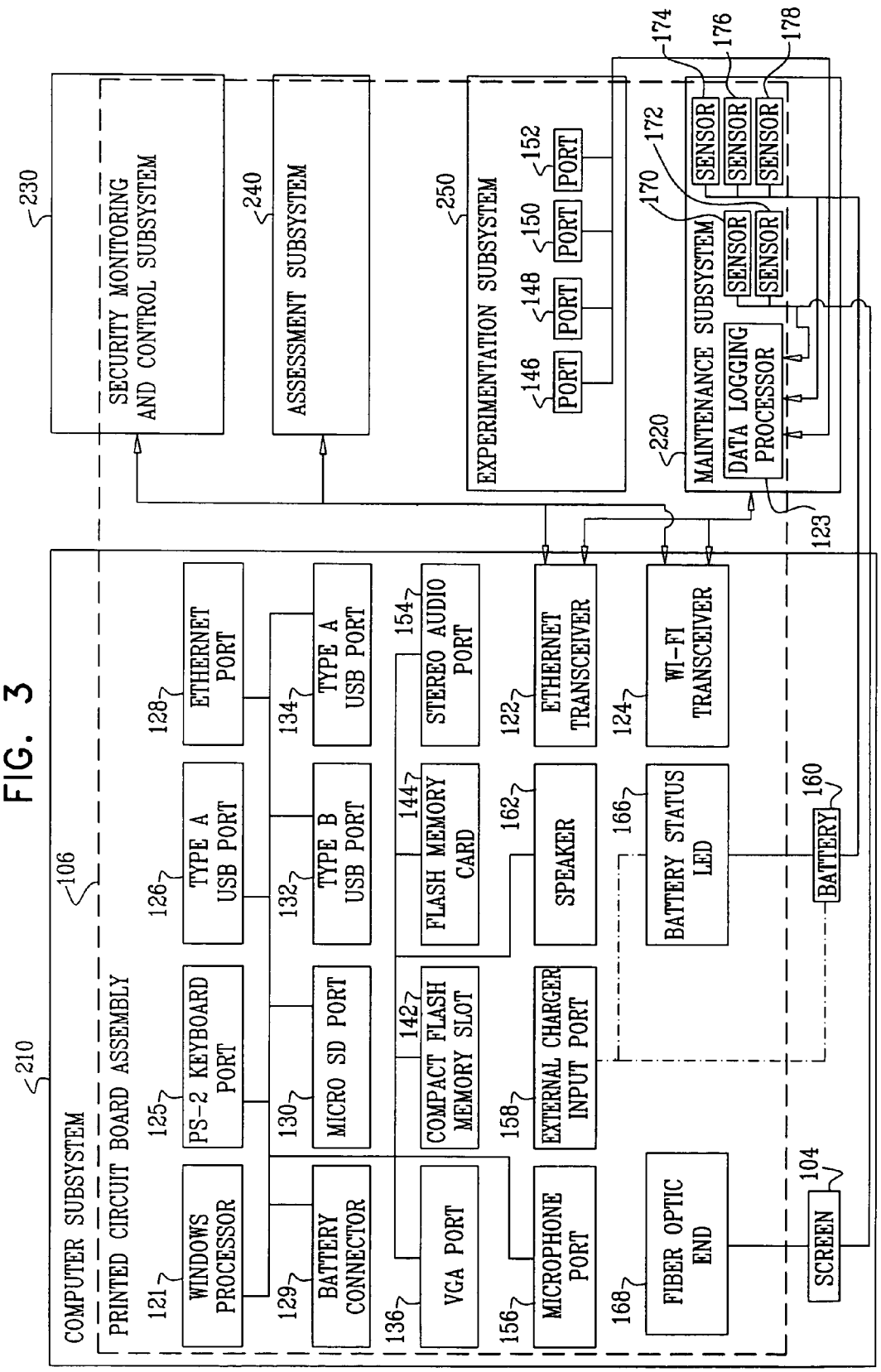
FIG. 3 is a simplified functional block diagram of the computer of FIGS. 1A-2.

Reference is now made to FIG. 3, which is a simplified functional block diagram of the computer of FIGS. 1A-2. As seen in FIG. 3, the computer 100 comprises a conventional computer subsystem 210, which includes, inter alia, screen 104 and portions of circuit board assembly 106 (FIG. 2), such as WINDOWS® processor 121, PS-2 keyboard port 125, Type A USB port 126, ETHERNET® port 128, battery connector 129, micro SD port 130, Type B USB port 132, Type A USB port 134, VGA port 136, compact flash memory slot 142, flash memory card 144, stereo audio port 154 and microphone port 156, all of which preferably communicate with the WINDOWS® processor 121. Conventional computer subsystem 210 preferably additionally includes battery 160, the inverter (not shown), external charger input port 158 and battery status LED 166 which communicate with a battery charger (not shown), speaker 162 which communicates with an amplifier (not shown), which in turn communicates with WINDOWS® processor 121, fiber optic end 168, the ambient light sensor (not shown), ETHERNET® transceiver 122 and WI-FI transceiver 124.

In accordance with a preferred embodiment of the present invention, the computer 100 also comprises a maintenance subsystem 220 (FIG. 4) which cooperates with the conventional computer subsystem 210 and preferably includes sensors 170 and 172, which monitor functionality of the inverter and sensors 174, 176 and 178 which preferably indicate when replacement of the battery 160 is required. Sensors 170, 172, 174, 176 and 178 preferably provide outputs to the data logging processor 123 which communicates via either or both of the ETHERNET® transceiver 122 and the WI-FI transceiver 124 with a computer network, as described hereinbelow. This feature provides remote monitoring of computer maintenance parameters.

Figure 5:
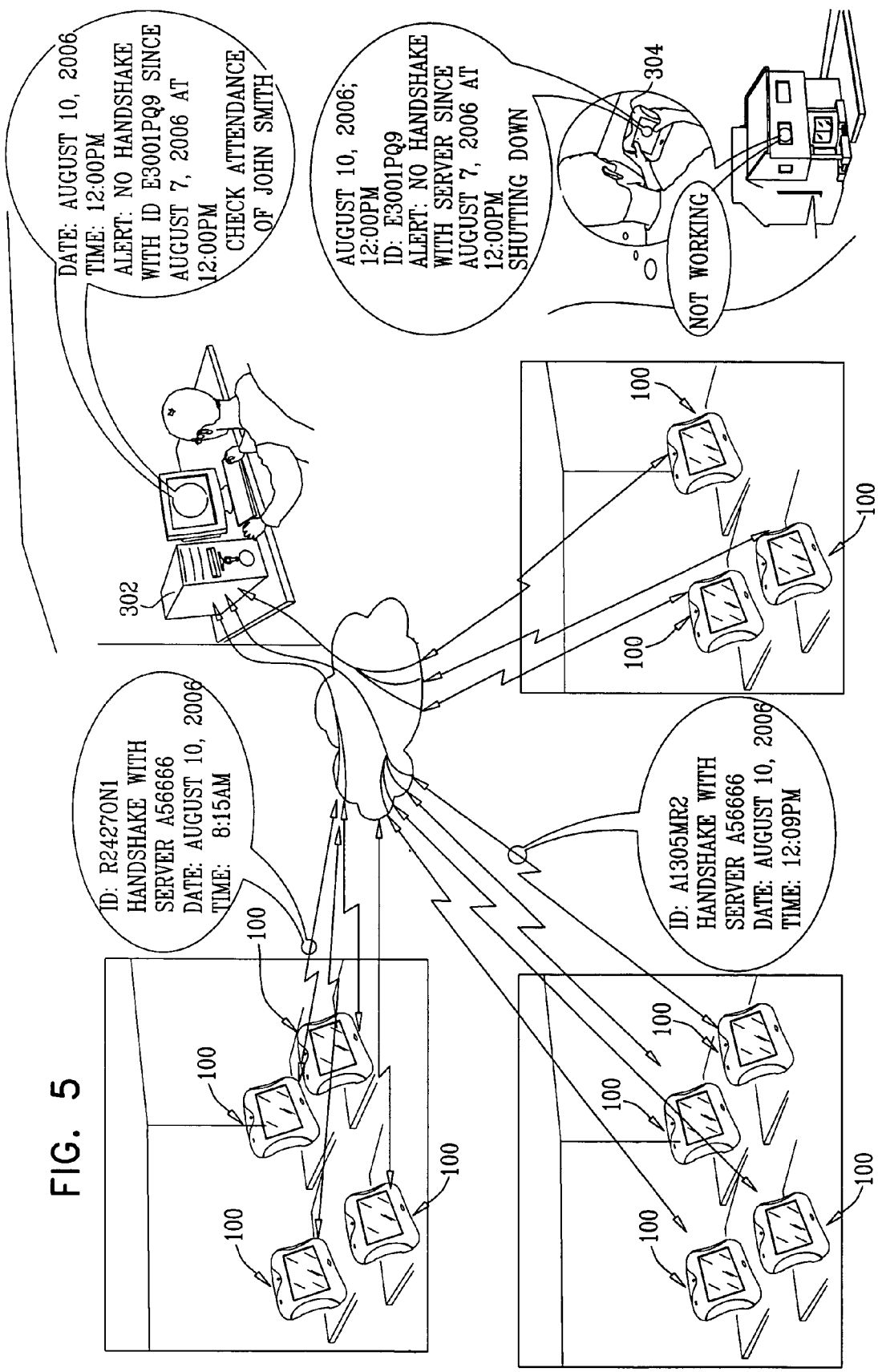
FIG. 5 is a simplified pictorial illustration of security monitoring and control functionality provided in accordance with another preferred embodiment of the present invention.

In accordance with a preferred embodiment of the present invention, the computer 100 preferably also comprises a security monitoring and control subsystem 230 which preferably cooperates with the conventional computer subsystem 210 and employs watchdog functionality implemented therein for automatically disabling operation of computer 100 in the absence of a handshake with an external server (FIG. 5). Communication with the external server preferably is provided via either or both of the ETHERNET® transceiver 122 and the WI-FI transceiver 124 with a computer network, as described hereinbelow.

In accordance with a preferred embodiment of the present invention, the computer 100 preferably also comprises an assessment subsystem 240 which cooperates with the conventional computer subsystem 210 and preferably employs one or more timing functionalities implemented therein for automatically enabling and/or disabling display of testing materials and or receipt of user inputs responsive thereto. Communication with an external assessment control server (FIG. 6) preferably is provided via either or both of the ETHERNET® transceiver 122 and the WI-FI transceiver 124 with a computer network, as described hereinbelow.

The computer 100 preferably also comprises an experimentation subsystem 250, including ports 146, 148, 150 and 152 which preferably communicate with the data logging processor 123. The experimentation subsystem 250 preferably cooperates with the conventional computer subsystem 210 which preferably has interactive e-book functionality implemented therein and which may communicate with an external experimentation control and logging server (FIG. 7) via either or both of the ETHERNET® transceiver 122 and the WI-FI transceiver 124 with a computer network, as described hereinbelow.

Figure 4:
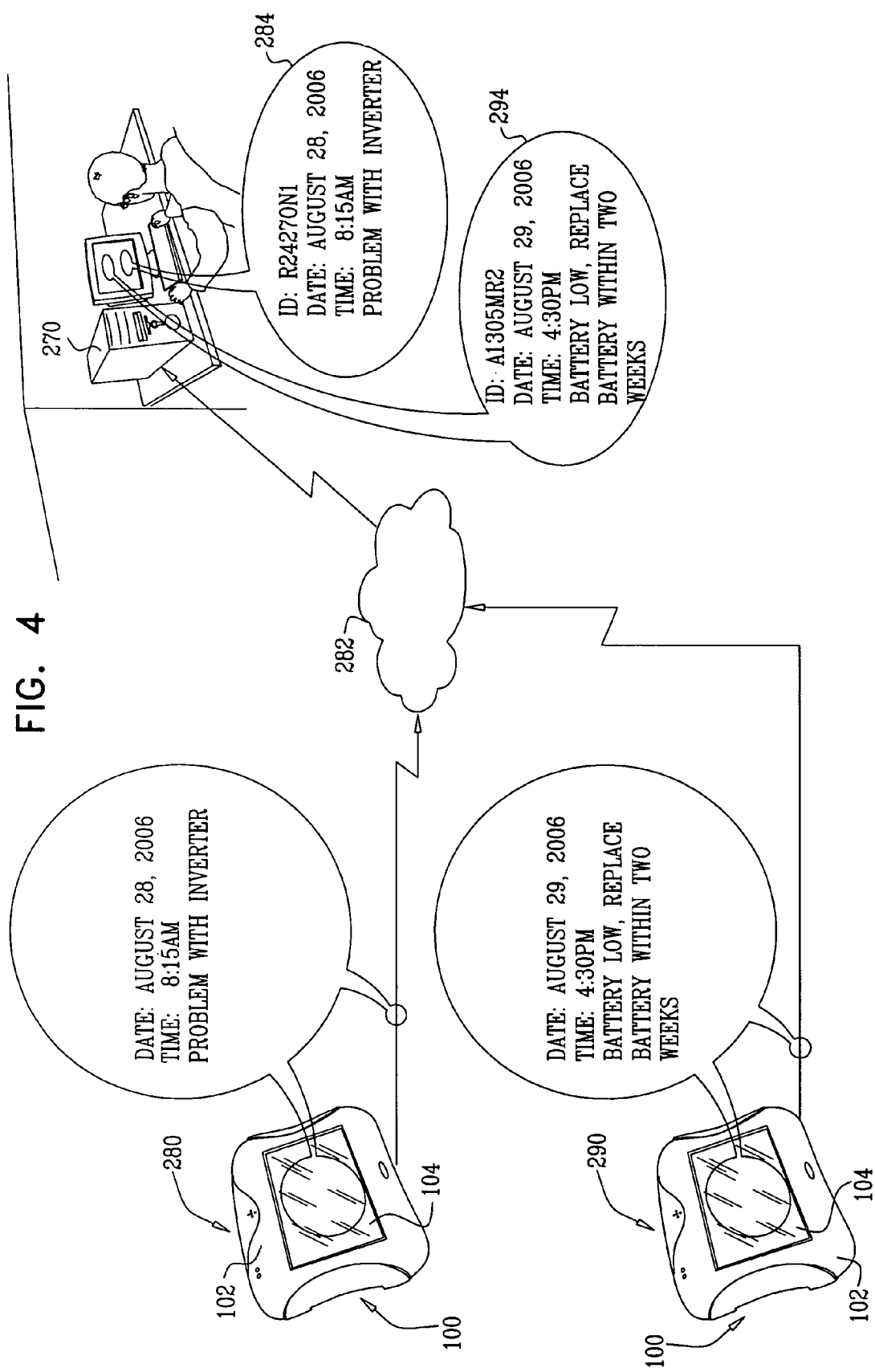
FIG. 4 is a simplified pictorial illustration of maintenance notification functionality provided in accordance with a preferred embodiment of the present invention.

Reference is now made to FIG. 4, which is a simplified pictorial illustration of maintenance notification functionality provided in accordance with a preferred embodiment of the present invention. As seen in FIG. 4, the maintenance notification functionality preferably utilizes the maintenance subsystem 220 (FIG. 3) of each of a multiplicity of computers 100 to notify an external maintenance notification server 270 that specific ones of computers 100 require specific maintenance attention.

Thus, in accordance with a preferred embodiment of the present invention, there is provided a computer system preferably employing a wireless computer network to communicate with a multiplicity of suitably enabled portable computers 100, each including at least one sensor for sensing an operational status aspect thereof and a communicator for providing status information via the network.

A maintenance center communicates via the computer network with the multiplicity of portable computers for automatically receiving the status information and for providing maintenance directives based thereon.

For example, sensors 170 and 172 (FIGS. 2 and 3), which monitor functionality of the LCD display 104 in one of a plurality of computers 100, such as a computer identified by reference numeral 280, may indicate a problem with the inverter driving the LCD display 104. This indication is communicated wirelessly or otherwise from data logging processor 123 (FIGS. 2 and 3) and one or both transceivers 122 and 124 (FIGS. 2 and 3) of computer 280, via a computer network 282 to maintenance notification server 270 which provides a corresponding report 284 to an operator.

Sensors 174, 176 and 178 (FIGS. 2 and 3) indicate when replacement of the battery 160 (FIGS. 2 and 3) is required in one of a plurality of computers 100, such as a computer identified by reference numeral 290. This indication is communicated wirelessly or otherwise from data logging processor 123 (FIGS. 2 and 3) and one or both transceivers 122 and 124 (FIGS. 2 and 3) of computer 290, via computer network 282 to maintenance notification server 270 which provides a corresponding report 294 to an operator.

Reference is now made to FIG. 5, which is a simplified pictorial illustration of a security monitoring and control functionality provided in accordance with a preferred embodiment of the present invention. As seen in FIG. 5, the security monitoring and control functionality preferably utilizes a computer network and the security monitoring and control subsystem 230 (FIG. 3) of each of a multiplicity of computers 100 to enable an external security monitoring and control server 302 to be aware that specific ones of computers 100 have not communicated with server 302 for at least a predetermined amount of time, typically 72 hours. This failure of communication may indicate that the computer has been misplaced or stolen or that a student in possession of the computer has not attended school. The security monitoring and control functionality may also employ a biometric sensor coupled to a USB port of computer 100 for verifying that a given computer is in the possession of an authorized user.

Responsive to the failure of communication between server 302 and a given computer, here designated by reference numeral 304, the computer 304 may be automatically shut down, as by conventional watchdog functionality implemented therein. Additionally or alternatively, a report may be provided by server 302 to school management alerting the school management of the failure to communicate and initiating an attendance inquiry.

In accordance with a preferred embodiment of the present invention, the computer network is operative to permit transmission of security status information only within a predetermined geographical region. Additionally or alternatively, the computer network is operative to permit transmission of security status information from a remote geographical location over a secured network connection.

Thus, in accordance with a preferred embodiment of the present invention, there is provided a computer system including a multiplicity of network enabled portable computers, each including at least one communicator for providing security status information via a network. A security center intermittently communicates via the computer network with the multiplicity of portable computers for automatically providing a security indication in response to a security status information communication failure fulfilling predetermined criteria.

Figure 6:
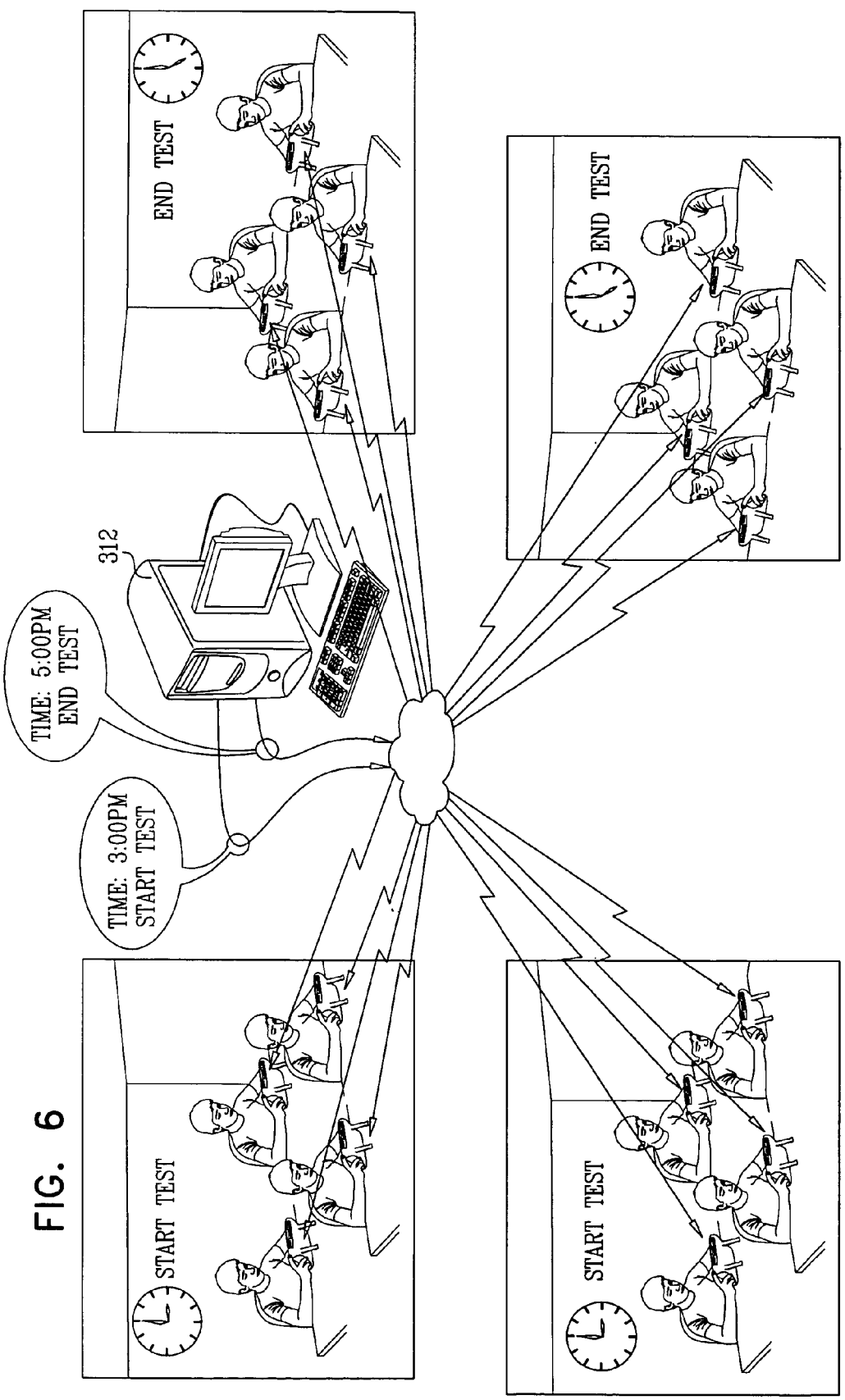
FIG. 6 is a simplified pictorial illustration of assessment control functionality provided in accordance with another preferred embodiment of the present invention.

Reference is now made to FIG. 6, which is a simplified pictorial illustration of assessment control functionality provided in accordance with a preferred embodiment of the present invention. As seen in FIG. 6, the assessment control functionality preferably utilizes the assessment control subsystem 240 (FIG. 3) and employs one or more timing functionalities implemented therein for automatically enabling and/or disabling display of testing materials and/or receipt of user inputs responsive thereto. Communication with the external assessment control server 312 is provided via either or both of the ETHERNET® transceiver 122 and the WI-FI transceiver 124 (FIGS. 2 and 3) with a computer network, as described hereinbelow. The assessment control functionality may also employ a biometric sensor coupled to a USB port of computer 100 for verifying that a given computer is in the possession of an authorized user.

Thus, in accordance with a preferred embodiment of the present invention, there is provided a distributed assessment system including a multiplicity of network enabled portable computers, each including at least one network communicator for receiving assessment materials, presenting them to a person undergoing assessment and providing assessment results via a computer network and an assessment controller communicating via the computer network with the multiplicity of portable computers and being operative for synchronizing the timing of presentation of the assessment materials to multiple persons undergoing assessment using the multiplicity of portable computers.

It is appreciated that control of the timing does not require simultaneous download of the assessment materials to the multiplicity of portable computers. The portable computers may be provided with a non-tamperable clock which actuates and terminates display of the assessment materials and which enables and disables assessment response data entry. It is appreciated that simultaneous start and stop of a testing program on a multiplicity of disparately located computer systems may be realized without requiring simultaneous download thereto.

It is also appreciated that the assessment materials preferably include multiple portions, such as multiple questions or questions having multiple answers, and the multiple portions of the assessment materials may be presented to some of the persons undergoing assessment in a different order than the order presented to others of the multiple persons, for example in order to prevent copying. It is appreciated that the order in which the portions of the assessment materials are presented to a given person undergoing assessment may be set by the portable computer used by that person or may alternatively be set by the external assessment control server 312.

Figure 7:
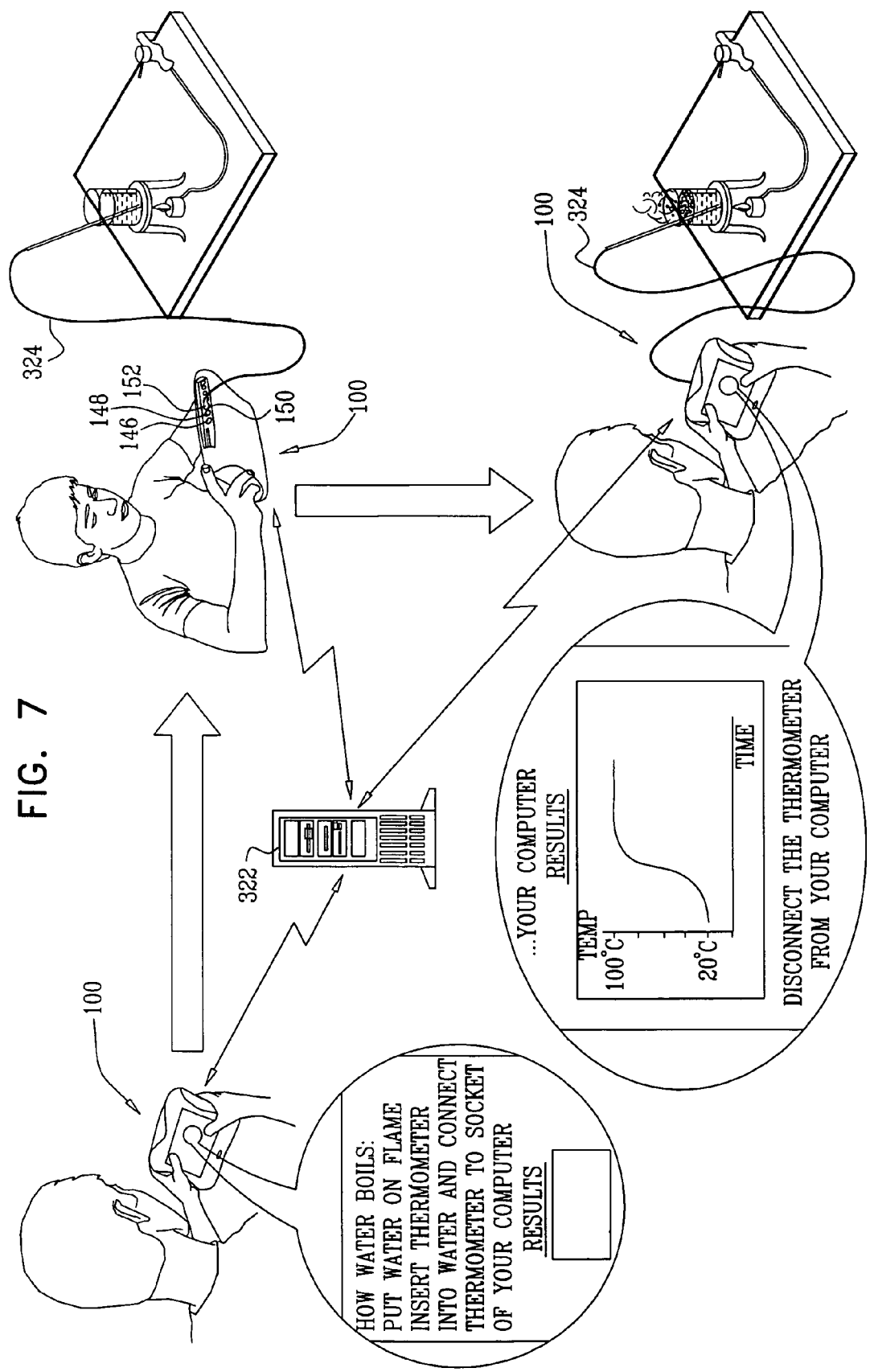
FIG. 7 is a simplified pictorial illustration of interactive e-book driven experimentation functionality provided in accordance with a further preferred embodiment of the present invention.

Reference is now made to FIG. 7, which is a simplified pictorial illustration of interactive e-book driven experimentation functionality provided in accordance with a further preferred embodiment of the present invention. As seen in FIG. 7, the e-book driven experimentation functionality preferably utilizes the experimentation subsystem 250 (FIG. 3) of computers 100, including ports 146, 148, 150 and 152 which communicate with the data logging processor 123 (FIGS. 2 and 3). The experimentation subsystem 250 cooperates with the conventional computer subsystem 210 (FIG. 3) which has interactive e-book functionality implemented therein and which may communicate with an external experimentation control and logging server 322 via either or both of the ETH- ERNET® transceiver 122 and the WI-FI transceiver 124 (FIGS. 2 and 3) of computer 100.

Typically, the e-book provides step-by-step prompts to a student carrying out an experiment and the student connects one or more external sensors 324 to one or more of ports 146, 148, 150 and 152 in order to conduct a given experiment.

Thus, in accordance with a preferred embodiment of the present invention, there is provided an interactive computer including at least one port enabling connection thereto of an external sensor for sensing an experimental parameter and interactive e-book software operative to prompt a user to conduct an experiment and to receive the experimental parameter from the external sensor and to display a visual representation of the experimental parameter.

Examples of external sensors include thermocouples, light sensors, humidity sensors, motion sensors, pH sensors, electrical parameter sensors, biometric sensors and audio sensors.

It is appreciated that the results and/or visual display of the results of the experiment conducted may be logged by the external experimentation control and logging server 322 for future reference.

Figure 8:
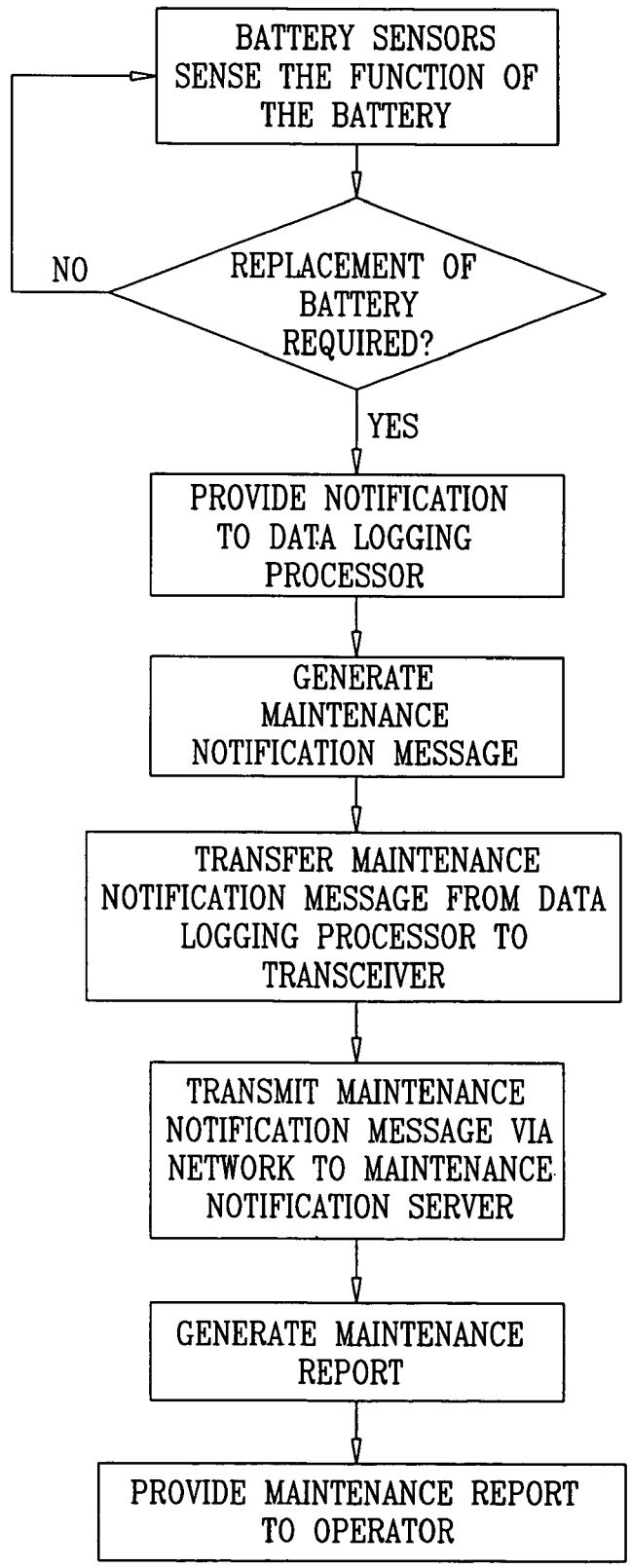
FIG. 8 is a simplified flow chart of maintenance notification functionality of FIG. 4.

Reference is now made to FIG. 8, which is a simplified flow chart of maintenance notification functionality of FIG. 4. As seen in FIG. 8, at least one of sensors 174, 176 and 178 (FIGS. 2 and 3) continuously senses the function of battery 160 (FIGS. 2 and 3).

When one of sensors 174, 176 and 178 senses that replacement of battery 160 is required, the sensor provides a notification to data logging processor 123 (FIGS. 2 and 3). Data logging processor generates a maintenance notification message, and transfers the maintenance notification message to one or both of transceivers 122 and 124 (FIGS. 2 and 3).

One or both of transceivers 122 and 124 then transmit the maintenance notification message, via the computer network, to maintenance notification server 270 (FIG. 4). Maintenance notification server 270 generates a maintenance report indicating the computers for which maintenance is required, which is then provided to the operator.

Figure 9:
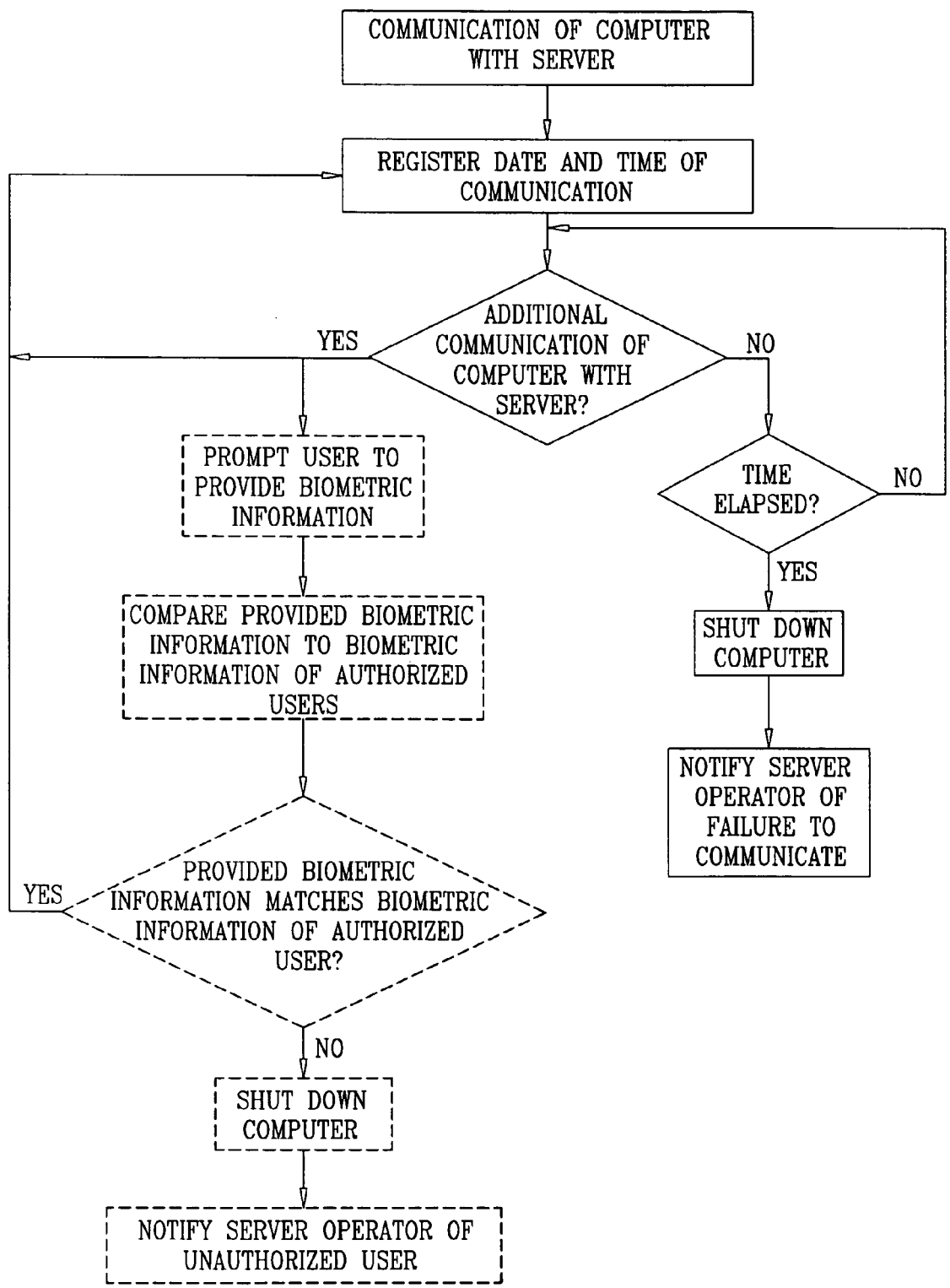
FIG. 9 is a simplified flow chart of security monitoring and control functionality of FIG. 5.

Reference is now made to FIG. 9, which is a simplified flow chart of security monitoring and control functionality of FIG. 5. As seen in FIG. 9, a computer 100 (FIGS. 1A-3) initially communicates with the security monitoring and control server 302 (FIG. 5) via a network, and the date and time of the communication is registered by the computer and the server.

Thereafter, the computer and the server continuously check for an additional communication between the computer and the server. The additional communication may be via the network employed for a previous communication therebetween or via a different network.

If the computer has communicated with the server, the user may optionally be prompted to provide biometric information. If the user was not prompted to provide biometric information, the new date and time of communication are registered by the computer and server.

Alternatively, if the user was prompted to provide biometric information, the provided biometric information is compared with biometric information of authorized users of the computer, stored on the server. If the biometric information matches, the new date and time of communication are registered by the computer and server. It the biometric information does not match that of authorized users of the computer, the computer preferably employs a watchdog functionality implemented therein to shut down. Preferably, the server provides a message to the operator, notifying him that the computer is in the possession of an unauthorized user.

If the computer has not communicated with the server and a predetermined time duration has elapsed since the last communication of the computer with the server, the computer employs the watchdog functionality implemented therein to shut down. Preferably, the server provides a message to the operator, notifying him that the computer has failed to communicate with the server for the predetermined time duration.

Figure 10A:
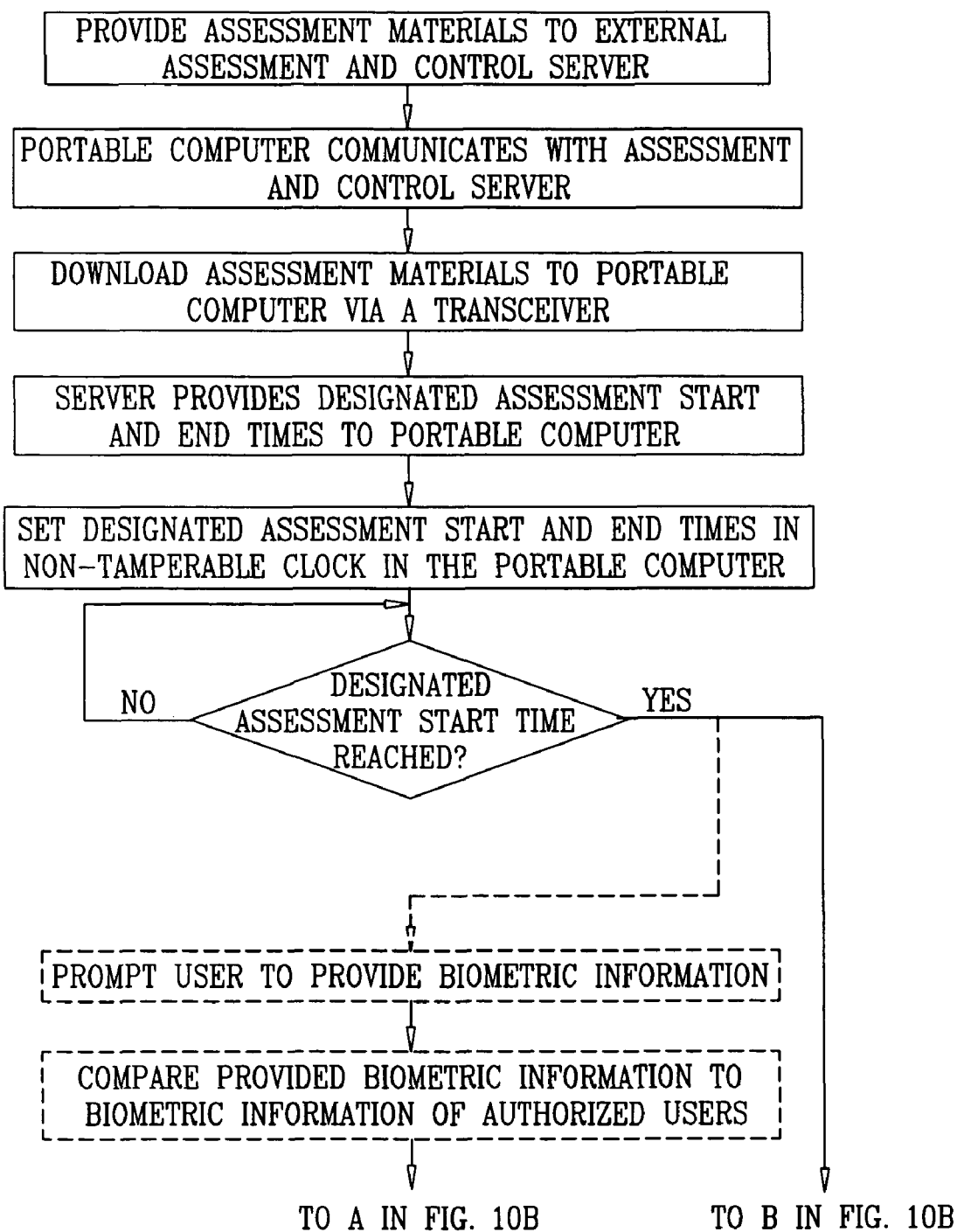
FIGS. 10A and 10B together form a simplified flow chart of assessment control functionality of FIG. 6.
Figure 10B:
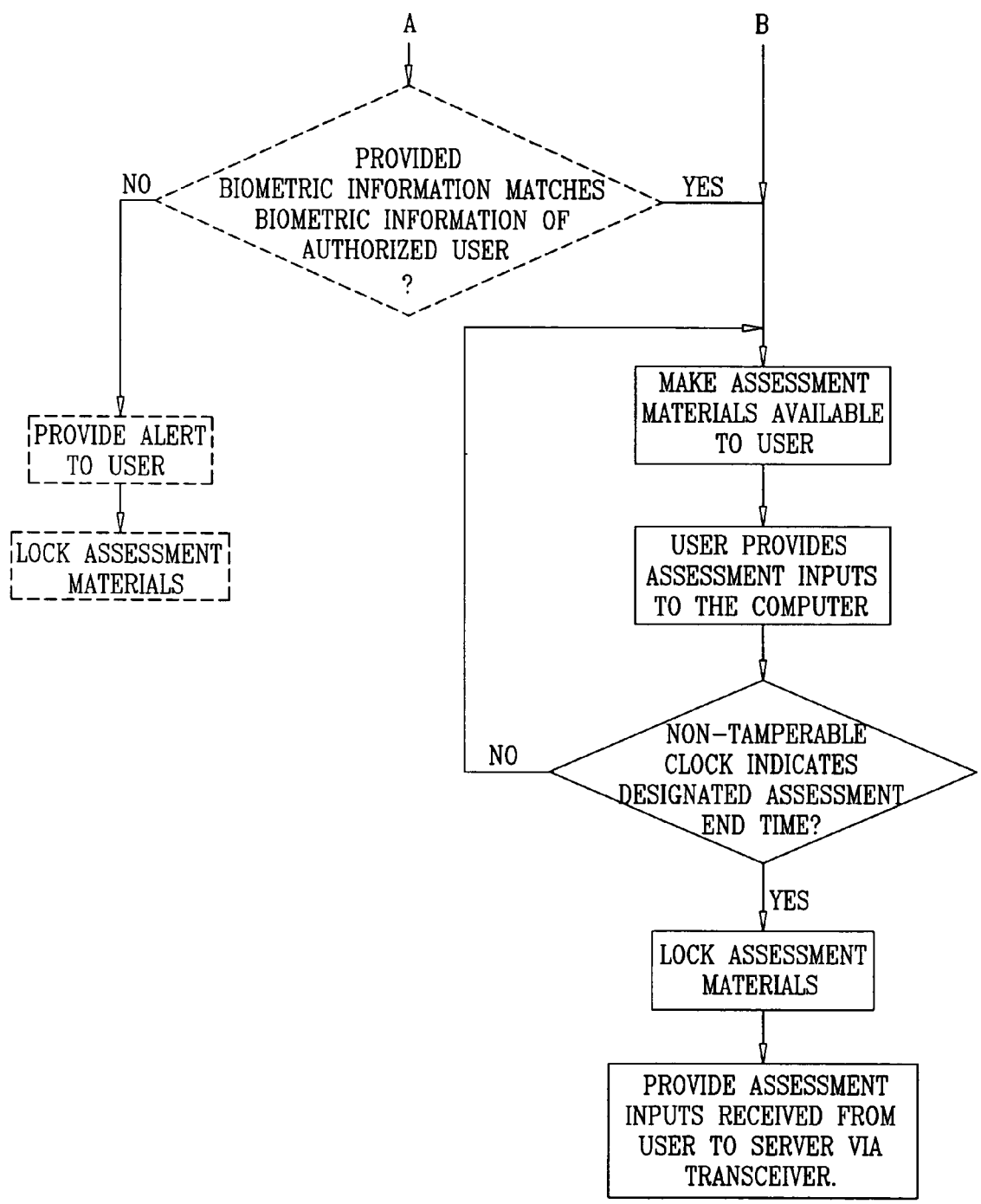

Reference is now made to FIGS. 10A and 10B, which, taken together, are a simplified flow chart of assessment control functionality provided in accordance with another preferred embodiment of the present invention. As seen in FIG. 10, the assessment materials are provided to external assessment and control server 312 (FIG. 6), typically from an assessment control center.

Upon communication of each of computers 100 (FIGS. 1A-3) with server 312, the assessment materials are downloaded to each of the computers, via one or both of transceivers 122 and 124 (FIGS. 2 and 3). Alternatively, the assessment materials may be simultaneously downloaded to all the computers 100. The server 312 also provides to each of the computers 100 designated assessment start and end times, which are set in a non-tamperable clock built into each of the computers 100. It is appreciated that the non-tamperable clocks in the computers 100 are synchronized.

At the designated assessment start time, the user of a given computer is optionally prompted to provide biometric information. If the user was not prompted to provide biometric information, the assessment materials are made available to the user, and the user provides assessment inputs to the computer.

Alternatively, if the user was prompted to provide biometric information, the provided biometric information is compared with biometric information of authorized users of the given computer, which is stored on the server.

Turning to FIG. 10B, it is seen that if the biometric information provided by the user in possession of the given computer does not match the biometric information of any of the authorized users of the given computer, an alert is provided to the user and the assessment materials are locked for access by the unauthorized user. If the biometric information matches, the assessment materials are made available to the user in possession of the given computer, and the user provides assessment inputs to the computer.

When the non-tamperable clock indicates the designated assessment end time, the assessment materials are automatically and simultaneously locked for access by the user of each of the computers. Preferably, the assessment inputs provided by the user are transmitted from each of the portable computers 100 to the server 312 via one or both of transceivers 122 and 124 (FIGS. 2 and 3) or to another suitable assessment and control center.

Figure 11:
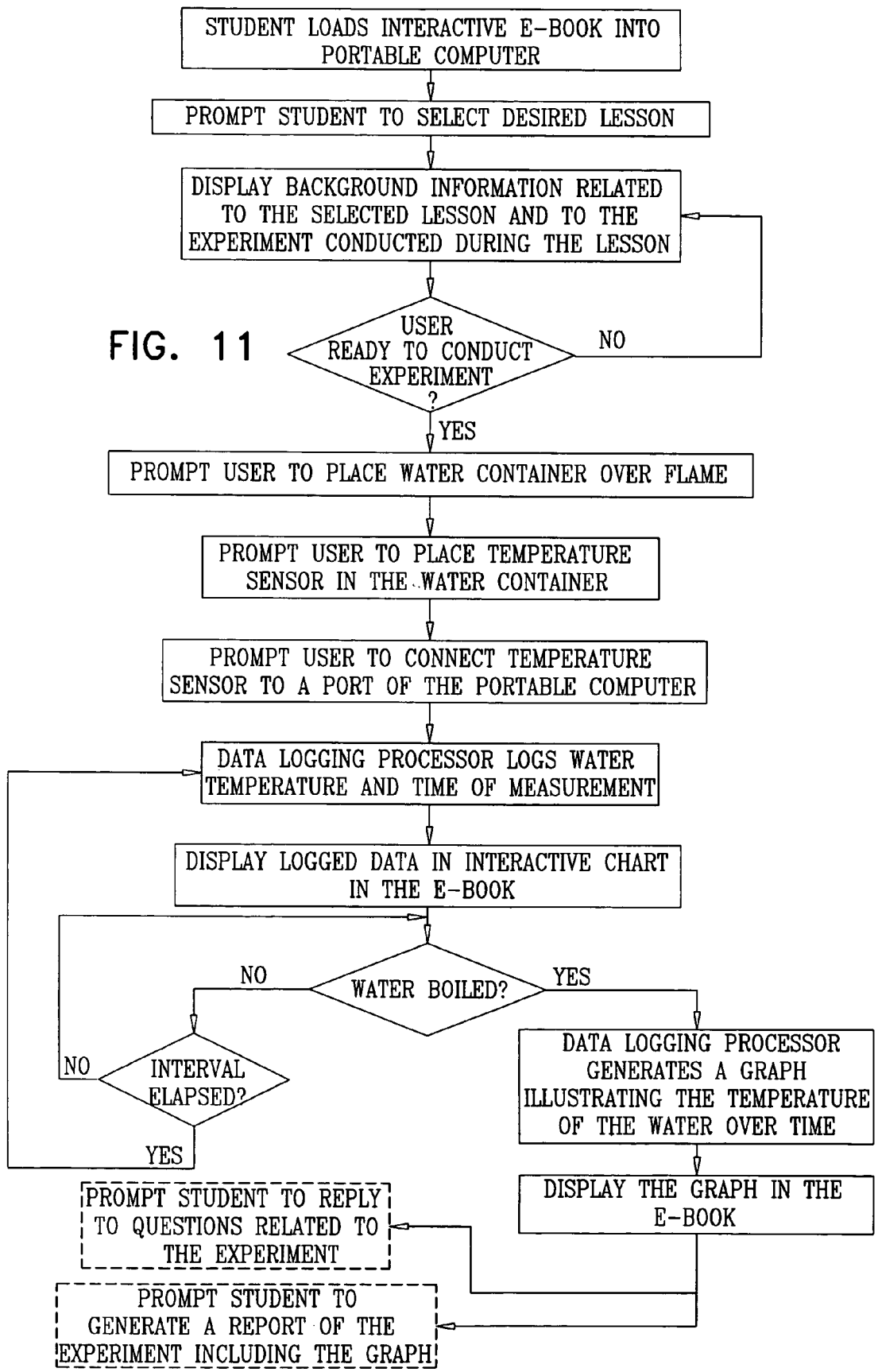
FIG. 11 is a simplified flow chart of interactive e-book driven experimentation functionality of FIG. 7.

Reference is now made to FIG. 11, which is a simplified flow chart of interactive e-book driven experimentation functionality provided in accordance with a further preferred embodiment of the present invention. As seen in FIG. 11, a user, typically a student, loads an interactive e-book onto his portable computer 100, by employing the experimentation subsystem 250 (FIG. 3). The interactive e-book preferably displays a welcome note, and prompts the student to choose a desired lesson.

When the desired lesson is chosen, the e-book displays background information related to the lesson and to an experiment that will be conducted during the lesson, for example timing of the rise in the temperature of water being boiled. The background information is displayed till the student indicates that he is ready to conduct the experiment.

The user is then prompted to place a water container over a flame in order to heat the water, and to connect a temperature sensor, placed inside the water container, to one of ports 146,

148, 150 and 152 (FIGS. 2 and 3). The initial temperature of the water and the time at which it was measured are logged by the data logging processor 123 (FIGS. 2 and 3) and are displayed to the user in an interactive chart forming part of the interactive e-book.

As long as the water has not boiled, following each elapse of a predetermined interval, the data logging processor logs the temperature of the water and the time at which the temperature was measured, and displays the logged data to the user as part of the interactive chart. Once the water has reached a boiling point, indicated by the temperature sensor sensing the water temperature to be 100 degrees C. or by the student indicating bubbling of the water in the container, the data collected in the interactive chart is employed by the data logging processor 123 to generate a graph demonstrating the rise of water temperature over time, and the graph is displayed to the student as part of the interactive e-book.

The student may then be prompted to respond, within the interactive e-book, to questions related to the experiment conducted and/or may be prompted to provide a written report of the experiment, which may incorporate the graph generated by the data logging processor 123.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A distributed assessment comprising: network enabled portable computers, each including:
    a housing having a screen;
    at least one sensor port physically connectable to an external sensor that senses an experimental parameter received during conduction of a guided experiment;
    a data logging processor coupled to the at least one sensor port to receive and log the experimental parameter;
    interactive e-book software operative to provide prompts to a student conducting the guided experiment, to receive said experimental parameter from said external sensor and to display a visual representation of said experimental parameter on the screen;
    at least one network communicator for receiving assessment materials, providing assessment results via a computer network, and presenting on the screen said assessment materials to a person undergoing assessment;
    an assessment controller communicating via said computer network with said portable computers and operative to synchronize the timing of presentation of said assessment materials to multiple persons undergoing assessment using said portable computers; and
    an experimentation control and logging server communicating with said portable computers via said computer network and being operative to log said experimental parameter and said visual representation of said experimental parameter.

2. A distributed assessment system according to claim 1 and wherein said assessment controller is also operative to synchronize the timing of a window for receiving assessment inputs from said multiple persons undergoing assessment using said portable computers.

3. A distributed assessment system according to claim 2 and wherein said assessment controller is operative to synchronize the timing of said window by simultaneously presenting said assessment materials to said multiple persons using said portable computers and simultaneously terminating presentation of said assessment materials to said multiple persons using said portable computers.

4. A distributed assessment system according to claim 1 and wherein said assessment controller is operative to synchronize the timing of presentation by simultaneously presenting said assessment materials to said multiple persons using said portable computers.

5. A distributed assessment system according to claim 1 and wherein said assessment materials include multiple portions and said multiple portions of said assessment materials are presented to at least one of said multiple persons in a different order than the order presented to at least one other of said multiple persons.

6. A distributed assessment system according to claim 1 and wherein at least one of said portable computers includes a biometric information input device, and wherein said biometric information input device is employed to determine whether one of said multiple persons using one of said at least one of said portable computers is authorized to use said one of said at least one of said portable computers, prior to presenting said assessment materials to said one of said multiple persons.

7. A distributed assessment system according to claim 1 and wherein at least one of said portable computers receives said assessment materials at a different time than the time at which said assessment materials are received by at least one other of said portable computers.

8. A distributed assessment system according to claim 1 and wherein said computer network is a wireless computer network.

9. An interactive computer that enable school students to conduct guided experiments, the interactive computer comprising:
    a housing;
    a screen;
    interactive e-book software;
    a circuit board assembly, the circuit board assembly comprising:
        at least one sensor port physically connectable to an external sensor that senses an experimental parameter received during conduction of a guided experiment;
        a data logging processor coupled to the at least one sensor port to receive and log the experimental parameter; and
        a user interface;
    wherein the interactive e-book software is operative to provide prompts to a student conducting the guided experiment to connect the external sensor to the at least one sensor port, and the interactive e-book software is further operative to receive said experimental parameter from said external sensor and to display a visual representation of said experimental parameter on the screen and wherein the interactive computer is operative to communicate with an experimentation control and logging server via a computer network, the experimentation control and logging server being operative to log said experimental parameter and said visual representation of said experimental parameter.

10. An interactive computer according to claim 9 and wherein said external sensor comprises at least one of a thermocouple, a light sensor, a humidity sensor, a motion sensor, a pH sensor, an electrical parameter sensor, a biometric sensor and an audio sensor.

11. An interactive experimentation system that enables school students to conduct guided experiments, the system comprising:

a plurality of network enabled portable computers, each including:
  a housing having a screen, a circuit board assembly and interactive e-book software,
  wherein the circuit board assembly comprises:
    at least one sensor port physically connectable to an external sensor that senses an experimental parameter received during conduction of a guided experiment;
    a data logging processor coupled to the at least one sensor port to receive and log the experimental parameter; and
    a user interface;
  wherein the interactive e-book software is operative to provide prompts to a student conducting the guided experiment, to receive said experimental parameter from said external sensor and to display a visual representation of said experimental parameter on the screen;
and
an experimentation control and logging server communicating with said plurality of network enabled portable computers via a computer network and being operative to log said experimental parameter and said visual representation of said experimental parameter.

12. An interactive experimentation system according to claim 11 and wherein said external sensor comprises at least one of a thermocouple, a light sensor, a humidity sensor, a motion sensor, a pH sensor, an electrical parameter sensor, a biometric sensor and an audio sensor.

13. An interactive experimentation system according to claim 11 and wherein said computer network is a wireless computer network.

14. The interactive experimentation system of claim 11 wherein each of said network enabled portable computers comprises at least one internal sensor for sensing an operational status aspect thereof and at least one communicator for providing status information based on an output of said at least one internal sensor via said computer network; and
  wherein the interactive experimentation system further comprises a maintenance center communicating via said computer network with said portable computers and being operative for automatically receiving said status information and for providing maintenance directives based thereon.

15. The interactive experimentation system according to claim 14 and wherein said at least one internal sensor comprises at least one of an inverter current sensor operative to measure a current to an inverter and an inverter output voltage sensor operative to measure a high voltage output of said inverter.

16. The interactive experimentation system according to claim 15 and wherein said status information comprises information related to functionality of at least one of said inverter and a display of said portable computer.

17. The interactive experimentation system according to claim 14 and wherein said at least one internal sensor comprises at least one of a voltage sensor, a current sensor and a temperature sensor.

18. The interactive experimentation system according to claim 14 and wherein said status information comprises information related to functionality of a battery of said portable computer.

19. The interactive experimentation system of claim 11 wherein each of said network enabled portable computers comprises at least one communicator for providing security status information received from said computer via said computer network; and
  wherein the interactive experimentation system further comprises a security center intermittently communicating via said computer network with said portable computers and being operative for automatically providing a security indication in response to a security status information communication failure, of at least one of said portable computers, fulfilling predetermined criteria.

20. The interactive experimentation system according to claim 19 and wherein said computer network is operative to permit transmission of security status information only within a predetermined geographical region.

21. The interactive experimentation system according to claim 19 and wherein said predetermined criteria comprises the elapse of a predetermined time duration since a previous communication between said at least one portable computers and said security center.

22. The interactive experimentation system according to claim 19 and wherein said at least one of said portable computers includes a security subassembly which is operative to disable said at least one of said portable computers in response to said security status information communication failure.

23. The interactive experimentation system according to claim 19 and wherein at least one of said multiplicity of portable computers also comprises computerized watchdog functionality operative to disable said at least one of said multiplicity of portable computers in response to said security status information communication failure.

24. The interactive experimentation system according to claim 19 and wherein said computer network is operative to permit transmission of security status information from a remote geographical location over a secured network connection.

25. The interactive experimentation system according to claim 19 and wherein each of said portable computers includes at least one biometric information in communication with a biometric information input device, and wherein inputs received by said biometric information input device are employed to determine whether said at least one biometric information is in possession of an authorized user thereof.

26. The interactive experimentation system according to claim 19 and wherein said security indication comprises a report including identification of said at least one of said portable computers.

27. The interactive experimentation system of claim 11, wherein each of said network enabled portable computers comprises at least one network communicator for receiving assessment materials, and providing assessment results via said computer network, each of portable computers presenting said assessment materials to a person undergoing assessment on the screen; and
  wherein the interactive experimentation system further comprises an assessment controller communicating via said computer network with said portable computers and being operative to synchronize the timing of a window for receiving assessment inputs from multiple persons undergoing assessment using said multiplicity of portable computers.

28. The interactive experimentation system according to claim 27 and wherein said assessment controller is operative to synchronize the timing of said window by simultaneously presenting said assessment materials to said multiple persons using said portable computers and simultaneously terminating presentation of said assessment materials to said multiple persons using said portable computers.

29. The interactive experimentation system according to claim 27 and wherein said assessment materials include multiple portions and said multiple portions of said assessment materials are presented to at least one of said multiple persons in a different order than the order presented to at least one other of said multiple persons.

30. The interactive experimentation system according to claim 27 and wherein at least one of said portable computers include a biometric information input device, and wherein said biometric information input device is employed to determine whether one of said multiple persons using one of said at least one of said portable computers is authorized to use said one of said at least one of said portable computers, prior to presenting said assessment materials to said one of said multiple persons.

31. The interactive experimentation system according to claim 27 and wherein at least one of said portable computers receives said assessment materials at a different time than the time at which said assessment materials are received by at least one other of said portable computers.

* * * * *